US008928743B2

(12) United States Patent
Ishida

(10) Patent No.: US 8,928,743 B2
(45) Date of Patent: Jan. 6, 2015

(54) RADIO SIGNAL TRANSMITTER, STEREOSCOPIC IMAGE GLASSES, AND IMAGE DISPLAY SYSTEM

(75) Inventor: Akihito Ishida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 364 days.

(21) Appl. No.: 13/337,997

(22) Filed: Dec. 27, 2011

(65) Prior Publication Data

US 2012/0194658 A1 Aug. 2, 2012

(30) Foreign Application Priority Data

Jan. 27, 2011 (JP) ................................ 2011-015668

(51) Int. Cl.
| H04N 13/04 | (2006.01) |
| G02B 27/22 | (2006.01) |
| G09G 3/00 | (2006.01) |

(52) U.S. Cl.
CPC ........ *G02B 27/2264* (2013.01); *H04N 13/0438* (2013.01); *H04N 13/0497* (2013.01); *G09G 3/003* (2013.01); *G09G 2330/021* (2013.01)
USPC .......................................................... 348/56

(58) Field of Classification Search
CPC ....................... H04N 13/0429; H04N 13/0438
USPC .................... 348/51, 55, 56, 57, 54
See application file for complete search history.

(56) References Cited

U.S. PATENT DOCUMENTS

| 5,475,877 | A | * | 12/1995 | Adachi ...................... 455/343.2 |
| 6,791,599 | B1 | * | 9/2004 | Okada et al. .................... 348/56 |
| 8,432,437 | B2 | * | 4/2013 | Shintani ........................ 348/56 |
| 8,610,764 | B2 | * | 12/2013 | Shintani ........................ 348/56 |
| 8,675,056 | B2 | * | 3/2014 | Ishida ............................ 348/56 |
| 2007/0047690 | A1 | * | 3/2007 | Zhao et al. .................... 375/376 |
| 2010/0165085 | A1 | | 7/2010 | MacNaughton et al. |

(Continued)

FOREIGN PATENT DOCUMENTS

| JP | 2-92187 A | 3/1990 |
| JP | 402092187 A | * 3/1990 |

(Continued)

OTHER PUBLICATIONS

Taniguchi, Shinichi, Machine generated translation of JP408336167A, Dec. 1996.*

(Continued)

*Primary Examiner* — David Harvey
(74) *Attorney, Agent, or Firm* — Birch, Stewart, Kolasch & Birch, LLP

(57) ABSTRACT

A radio signal transmitter receives, from an image display device (i) synchronizing signals for switching between displaying a right-eye image and displaying a left-eye image on the image display device and (ii) liquid crystal shutter control data indicating which image is displayed, and transmits the synchronizing signals and the liquid crystal shutter control data to stereoscopic image glasses. The radio signal transmitter includes: a period detecting section that detects a period of each of the synchronizing signals; and a period data storage section in which the period is stored as period data. The radio signal transmitter is configured such that the period data in the period data storage section is updated every time the period of each of the synchronizing signals is detected. This makes it possible to provide a radio signal transmitter, stereoscopic image glasses, and an image display system that achieve a reduction in power consumption.

8 Claims, 7 Drawing Sheets

(56) References Cited

U.S. PATENT DOCUMENTS

| | | |
|---|---|---|
| 2010/0194857 A1 | 8/2010 | Mentz et al. |
| 2010/0259603 A1 | 10/2010 | Mihara et al. |
| 2010/0295929 A1* | 11/2010 | Yoshifuji et al. ............... 348/53 |
| 2010/0315316 A1* | 12/2010 | Mihara et al. ................... 345/32 |
| 2011/0050849 A1* | 3/2011 | Lee et al. ....................... 348/43 |
| 2011/0050866 A1* | 3/2011 | Yoo ................................ 348/53 |
| 2011/0102426 A1* | 5/2011 | Moon et al. .................... 345/419 |
| 2011/0285833 A1* | 11/2011 | Tsurumoto et al. ............ 348/56 |
| 2014/0022361 A1* | 1/2014 | Yoshifuji et al. ............... 348/56 |

FOREIGN PATENT DOCUMENTS

| | | | | |
|---|---|---|---|---|
| JP | 8-265863 A | | | 10/1996 |
| JP | 8-278468 A | | | 10/1996 |
| JP | 8-317423 A | | | 11/1996 |
| JP | 408336167 A | * | | 12/1996 |
| JP | 11-55136 A | | | 2/1999 |
| JP | 11-98538 | | | 4/1999 |
| JP | 411098540 A | * | | 4/1999 |
| JP | 2001-75045 A | | | 3/2001 |
| JP | 2007-86851 A | | | 4/2007 |
| JP | 2010-62767 A | | | 3/2010 |
| JP | 2010268036 A | * | | 11/2010 |
| JP | 2010273259 A | * | | 12/2010 |
| KR | 2010-0127179 A | | | 12/2010 |

OTHER PUBLICATIONS

Notice of Allowance for co-pending U.S. Appl. No. 13/180,652, dated Nov. 25, 2013.

U.S. Office Action for co-pending U.S. Appl. No. 13/180,652, dated Jul. 16, 2013.

* cited by examiner

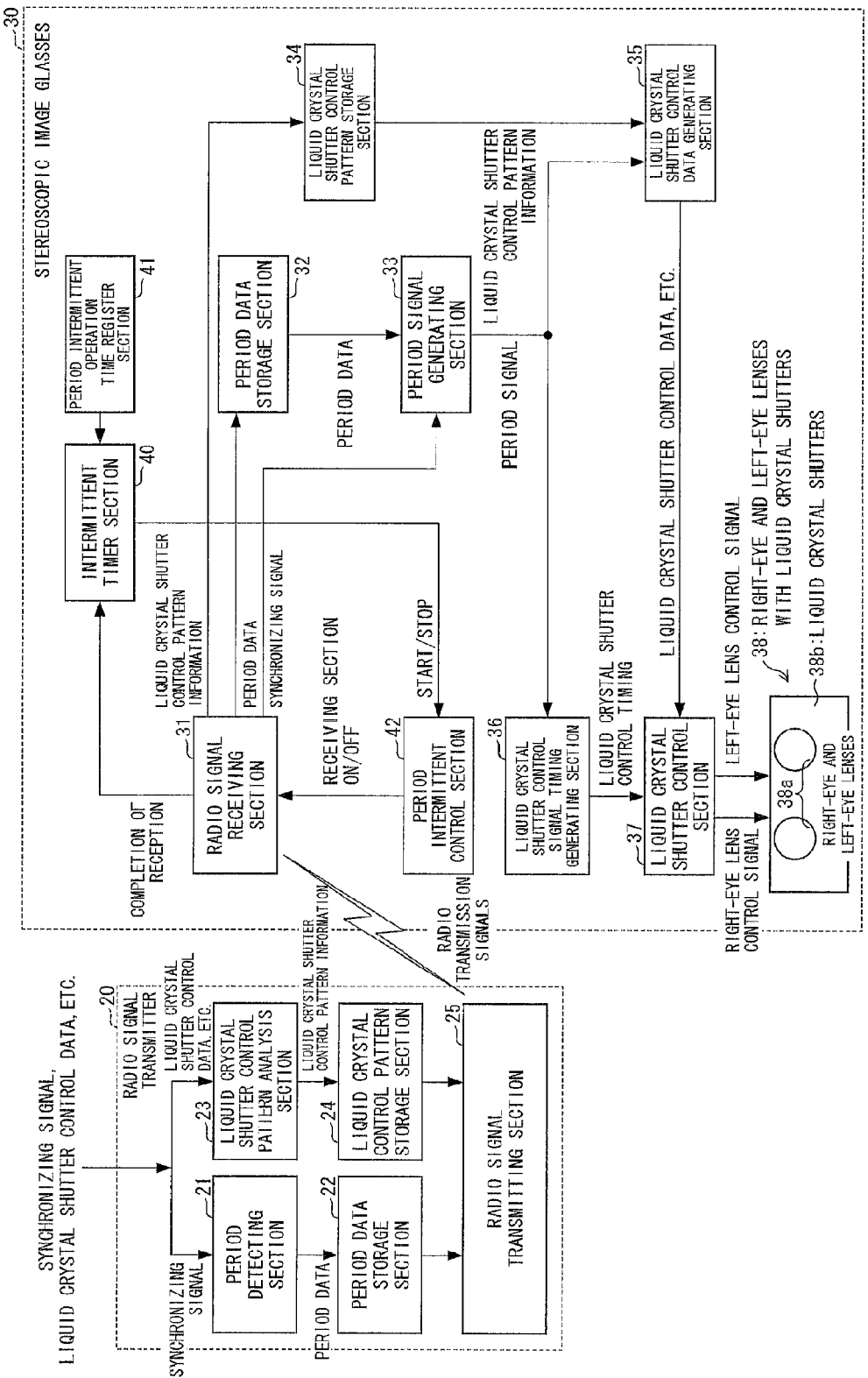
F I G. 1

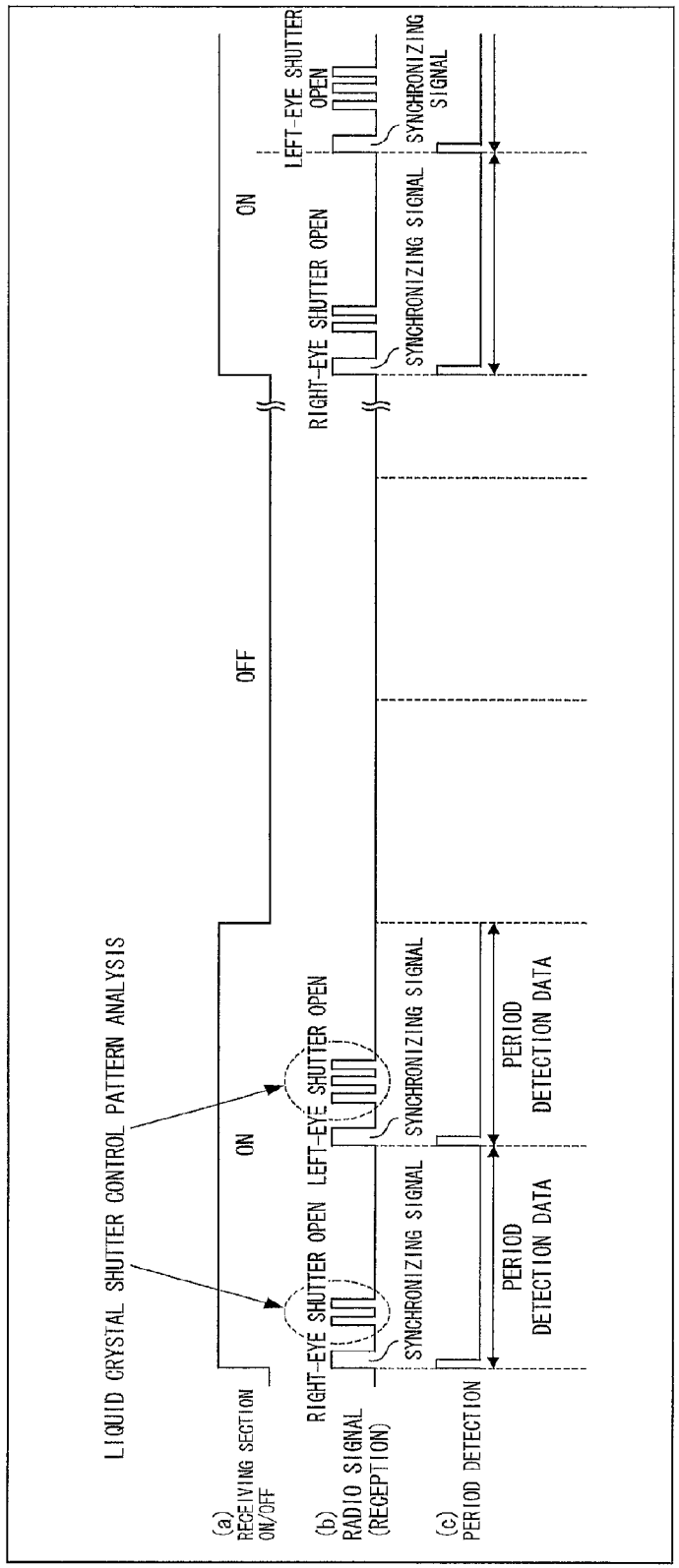
F I G. 7

RADIO SIGNAL TRANSMITTER, STEREOSCOPIC IMAGE GLASSES, AND IMAGE DISPLAY SYSTEM

This Nonprovisional application claims priority under 35 U.S.C. §119(a) on Patent Application No. 2011-015668 filed in Japan on Jan. 27, 2011, the entire contents of which are hereby incorporated by reference.

TECHNICAL FIELD

The present invention relates to: a radio signal transmitter, which receives, from an image display device of a TV (television) or of a PC (personal computer), (i) synchronizing signals for switching between displaying a right-eye image and displaying a left-eye image on the image display device and (ii) liquid crystal shutter control data indicating whether the right-eye or left-eye image is displayed, and which, after analyzing the synchronizing signals and the liquid crystal shutter control data, transmits the signals and the data to stereoscopic image glasses; stereoscopic image glasses, which allows viewing of stereoscopic images by receiving signals and data from such a radio signal transmitter and controlling opening and closing of liquid crystal shutters for right-eye and left-eye lenses; and an image display system including such a radio signal transmitter and such stereoscopic image glasses. In particular, the present invention relates to a technique for reducing power consumption.

BACKGROUND ART

Conventionally, viewing of stereoscopic images with stereoscopic image glasses having liquid crystal shutter lenses is achieved by displaying right-eye and left-eye images in sequence on an image display device of a TV (television) or of a PC (personal computer) and repeating an operation of, while a right-eye image is being displayed, opening only a liquid crystal shutter provided for a right-eye lens and, while a left-eye image is being displayed, opening only a liquid crystal shutter provided for a left-eye lens.

Specifically, as shown in FIG. 4, a radio signal transmitter 101 receives, from an image display device 106 of a TV or of a PC, (i) synchronizing signals for switching between right-eye and left-eye images and (ii) liquid crystal shutter control data indicating whether the right-eye or left-eye image is displayed and containing liquid crystal shutter control timings. The radio signal transmitter 101 transmits the synchronizing signals and the liquid crystal shutter control data in the form of radio signals via IR (infrared radiation) or RF (radio frequencies) as shown in (a) of FIG. 5. These pieces of information are received by a radio signal receiving section 111 of stereoscopic image glasses 110. Every time the radio signal receiving section 111 receives synchronizing signals, a liquid crystal shutter control signal timing generating section 112 of the stereoscopic image glasses 110 generates timings according to which liquid crystal shutters 114 of the stereoscopic image glasses 110 are controlled. Then, in accordance with the signals thus received, a liquid crystal shutter control section 113 of the stereoscopic image glasses 110 controls the liquid crystal shutters 114 for right-eye and left-eye lenses, respectively. This makes it possible to present right-eye and left-eye images separately to the right and left eyes of a viewer. This allows the viewer to view stereoscopic images.

This operation is described below with reference to timing charts shown in (a) through (d) of FIG. 5.

As shown in (a) of FIG. 5, the radio signal transmitter 101 transmits synchronizing signals each indicating a display update on the TV or PC image display device. Next, when a right-eye image is displayed, the radio signal transmitter 101 wirelessly transmits a "right shutter open" signal. Meanwhile, when a left-eye image is displayed, the radio signal transmitter 101 wirelessly transmits a "left shutter open" signal.

Meanwhile, as shown in (b) through (d) of FIG. 5, upon receiving the radio signals, the stereoscopic image glasses 110 output lens control signals for the right-eye and left-eye lenses, respectively, at optimal timings based on the synchronizing signals. Specifically, upon receiving the "right-eye shutter open" signal, the stereoscopic image glasses 110 output a lens control signal so that the liquid crystal shutter 114 for the right-eye lens opens. Further, upon receiving the "left-eye shutter open" signal, the stereoscopic image glasses 110 output a lens control signal so that the liquid crystal shutter 114 for the left-eye lens opens.

According to the conventional art described above, the radio signal transmitter 101 transmits radio signals at the timing switching between frames of the TV or PC display. For example, at a frame frequency of 100 Hz, the radio signal transmitter 101 transmits radio signals every 10 ms, and the stereoscopic image glasses 110 repeat reception of such radio signals at the same timing. This results in such a tendency that the higher the frame frequency becomes, the larger amount of power the radio signal receiving section 111 comes to consume.

Also, while the radio signal transmitter 101 has an always-on connection with a power supply of the television, the stereoscopic image glasses 110 are work on batteries. Thus, such a problem exists that as an increase in frame frequency leads to a decrease in the length of time that the stereoscopic image glasses 110 will continue to work.

In order to avoid such a problem, Patent Literature 1 discloses a radio signal receiving device for use in stereoscopic image glasses.

In order to solve the foregoing problem, the radio signal receiving device of Patent Literature 1 includes: a switch for turning on and off a power supply circuit of a receiving section; and means for controlling the switch. For example, even while receiving radio signals every 10 ms as mentioned above, the radio signal receiving device reduces power consumption by turning off the switch during an idle period between radio signal transmissions. Specifically, the radio signal receiving device detects the period of a radio signal sent from the transmitting end, calculates an idle period between radio signal transmissions, and turns off the switch during the idle period.

CITATION LIST

Patent Literature 1
Japanese Patent Application Publication, Tokukaihei, No. 08-265863 (Publication Date: Oct. 11, 1996)

SUMMARY OF INVENTION

Technical Problem

However, the conventional radio signal receiving device for use in stereoscopic image glasses as disclosed in Patent Literature 1 has such a problem that the effect of reducing power consumption is lessened when the frame frequency becomes high, because the device turns on and off the power supply of the receiving section in correspondence with each radio signal transmission.

Moreover, achieving a reduction in power consumption of the radio signal receiving device for use in stereoscopic image glasses is particularly a major challenge when the RF method is employed. Thus, an intermittent operation of radio signal reception is critical for battery-powered glasses.

The present invention has been made in view of the foregoing problems, and it is an object of the present invention to provide a radio signal transmitter, stereoscopic image glasses, and an image display system that achieve a reduction in power consumption.

Solution to Problem

In order to attain the foregoing object, a radio signal transmitter of the present invention is a radio signal transmitter for receiving, from an image display device (i) synchronizing signals for switching between displaying a right-eye image and displaying a left-eye image on the image display device and (ii) liquid crystal shutter control data indicating whether the right-eye or left-eye image is displayed, and for transmitting the synchronizing signals and the liquid crystal shutter control data to stereoscopic image glasses, the radio signal transmitter including: a period detecting section that detects a period of each of the synchronizing signals from an interval between the synchronizing signals received from the image display device; and a period data storage section in which the period detected by the period detecting section is stored as period data, the radio signal transmitter being configured such that the period data in the period data storage section is updated every time the period of each of the synchronizing signals is detected by the period detecting section.

According to the foregoing configuration, the radio signal transmitter calculates the interval between the synchronizing signals on receiving the synchronizing signals from the image display device, and detects the period of each of the synchronizing signals. Furthermore, the period detected by the radio signal transmitter is stored as the period data in the period data storage section of the radio signal transmitter. As a result, the period data storage section always has the latest period data stored therein. That is, the radio signal transmitter of the present invention always has the latest period data. Transmission of the latest period data to the stereoscopic image glasses makes it unnecessary for the stereoscopic image glasses to include a period data detecting section. This makes it possible to provide stereoscopic image glasses that achieve a reduction in cost.

Further, in order to attain the foregoing object, stereoscopic image glasses of the present invention includes: a radio signal receiving section that receives a synchronizing signal, period data, and liquid crystal shutter control pattern information from such a radio signal transmitter as that described above; a period signal generating section that repeatedly generates a period signal in accordance with received period data every time the radio signal receiving section receives a synchronizing signal from the radio signal transmitter; a period intermittent control section that carries out control so that the reception is suspended for a certain period of time, the stereoscopic image glasses being configured to continue generation of the period signal even while suspending the reception.

According to the configuration, the stereoscopic image glasses intermittently receive a synchronizing signal, period data, and liquid crystal shutter control pattern information from the radio signal transmitter. During the reception, the stereoscopic image glasses obtain the synchronizing signal, the period data, and the liquid crystal shutter control pattern information. Moreover, while not receiving a synchronizing signal, etc., the stereoscopic image glasses can repeatedly generate a period signal according to the synchronizing signal and the period data that are transmitted from the radio signal transmitter. This makes it unnecessary for the stereoscopic image glasses to carry out period detection by themselves. This makes it unnecessary for the stereoscopic image glasses to receive a synchronizing signal 3 to 5 times in order to detect a period, and make it only necessary for the stereoscopic image glasses receive a synchronizing signal to obtain period data and liquid crystal shutter control pattern information in order to get synchronized with the radio signal transmitter. This makes it possible to reduce current consumption currents for reception by ⅓ to ⅕.

Furthermore, in order to solve the foregoing problems, an image display system of the present invention includes: an image display device; a radio signal transmitter such as that described above; and stereoscopic image glasses such as those described above.

The foregoing configuration makes it possible to provide an image display system including a radio signal transmitter and stereoscopic image glasses, which can reduce power consumption.

Advantageous Effects of Invention

The present invention brings about an effect of providing a radio signal transmitter, stereoscopic image glasses, and an image display system that achieve a reduction in power consumption.

BRIEF DESCRIPTION OF DRAWINGS

FIG. 1, showing an embodiment of an image display system including a radio signal transmitter and stereoscopic image glasses in the present invention, shows a configuration of the radio signal transmitter and the stereoscopic image glasses.

FIG. 7 is a set of timing charts (a) through (c) showing a control operation in the stereoscopic image glasses according to the comparative embodiment.

DESCRIPTION OF EMBODIMENTS

Comparative Embodiment

Figure 6:
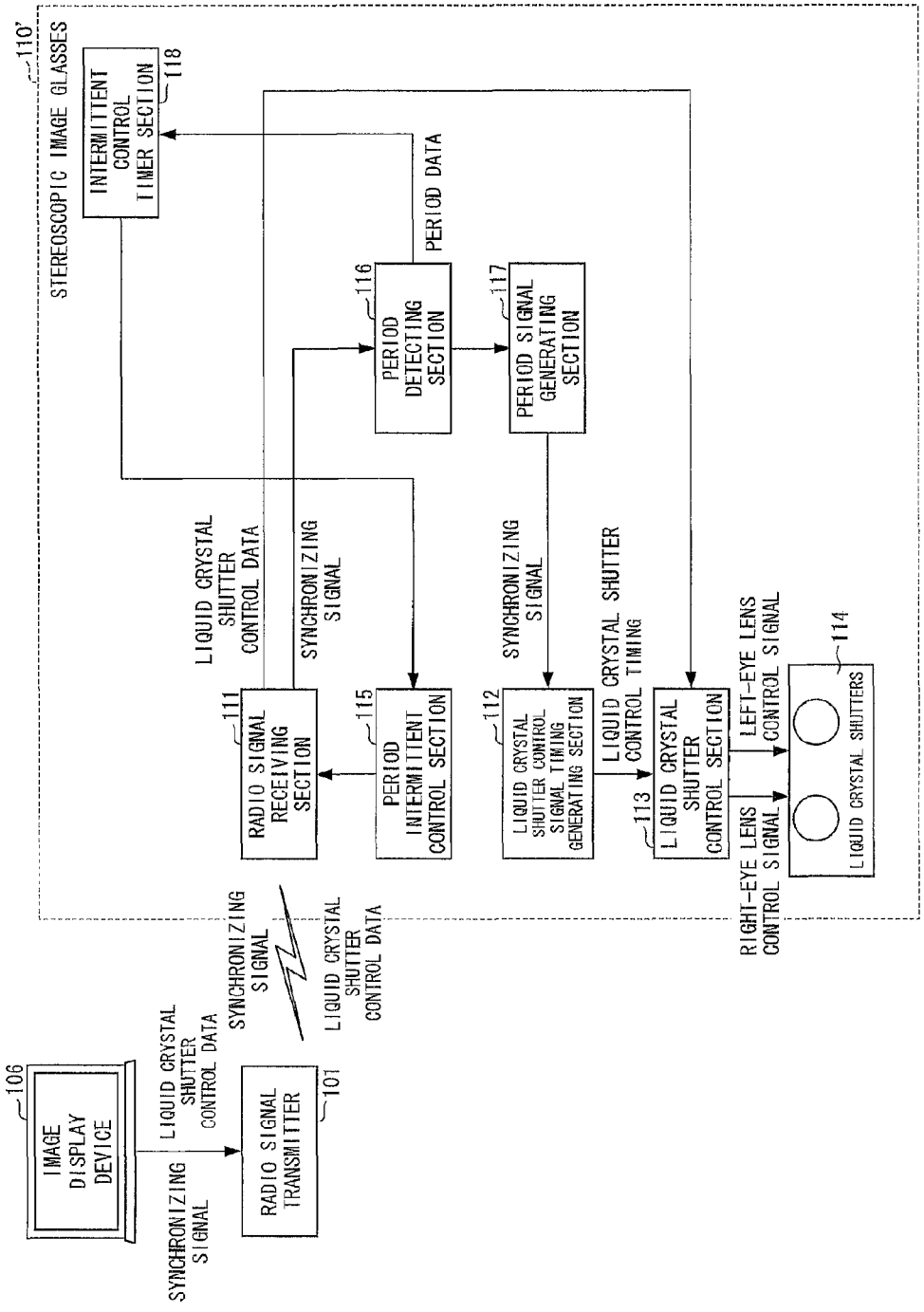
FIG. 6 is a block diagram showing a configuration of a radio signal transmitter and stereoscopic image glasses according to a comparative embodiment of the present invention.

Prior to a description of an embodiment of the present invention, a technique by which stereoscopic image glasses detects a period as proposed by the inventor of the present invention is described below with reference to FIG. 6 and (a) through (c) of FIG. 7. It is an object of this technique to provide stereoscopic image glasses that achieves a reduction in consumption current and improved noise resistance even when the frame frequency is high. FIG. 6 is a block diagram showing a configuration of stereoscopic image glasses 110' to which the technique is applied, and FIG. 7 is a set of timing charts (a) through (c) showing control operation of the stereoscopic image glasses 110'.

In order to achieve a reduction in consumption current even when the frame frequency is high, the stereoscopic image glasses 110' have a function to detect a period from an interval between synchronizing signals. Also, the stereoscopic image glasses 110 have a function to cause a radio signal receiving section 111 to operate intermittently, and achieve low power consumption by internally generating a period signal in accordance with the detected period data during stoppage of radio signal reception and actively causing the radio signal receiving section to operate intermittently.

As shown in FIG. 6, the stereoscopic image glasses 110 are configured by incorporating a period intermittent control section 115, a period detecting section 116, a period signal generating section 117, and an intermittent control timer section 118.

Control operation of such stereoscopic image glasses 110 is described below with reference to the timing charts shown in (a) through (c) of FIG. 7.

As shown in (a) of FIG. 7, the radio signal receiving section 111 achieves a reduction in consumption current by operating only while receiving a receiving section ON signal and by entering a standby state while receiving a receiving section OFF signal. It should be noted that the radio signal receiving section 111 receives the receiving section ON/OFF signals from the period intermittent control section 115. Therefore, when the period intermittent control timer section 118 has counted a predetermined downtime during which the radio signal receiving section 111 is suspending reception, the period intermittent control timer section 118 outputs a "resume" command to the period intermittent control section 115, whereby the period intermittent control section 115 outputs a receiving section ON signal and the radio signal receiving section 111 resumes reception.

Moreover, as shown in (b) of FIG. 7, while receiving a receiving section ON signal, the radio signal receiving section 111 receives at least synchronizing signals and liquid crystal shutter control data for opening and closing of right-eye and left-eye shutters. In the timing chart shown in (b) of FIG. 7, the radio signal receiving section 111 receives "right shutter open" liquid crystal shutter control data during the first cycle and receives "left shutter open" liquid crystal shutter control data during the second cycle.

Next, as shown in (c) of FIG. 7, the radio signal receiving section 111 outputs the synchronizing signals, which were received from the radio signal transmitter 101, to the period detecting section 116. This allows the period detecting section 116 to measure an interval between the synchronizing signals and generates period data. The period detecting section 116 sends the period data to the period signal generating section 117, and the period signal generating section 117 generates a period signal having the same period as the period data.

Furthermore, every time the period signal generating section 117 generates a period signal, the liquid crystal shutter control signal timing generating section 112 generates liquid crystal shutter control signal timing. In accordance with the liquid crystal shutter control timing thus generated, the liquid crystal shutter control section 113 outputs right and left lens control signals to control opening and closing of the liquid crystal shutters 114 for the right and left lenses.

However, the foregoing technique requires the stereoscopic image glasses 110 to measure an interval between synchronizing signals in order to detect a period. Moreover, depending on the type and combination of liquid crystal shutter control data for the right and left lenses, it becomes necessary to always measure an interval between synchronizing signals at least 3 to 5 times through radio signal reception at the time of resumption of reception after stoppage of radio signal reception by an intermittent operation.

In view of this, the present embodiment provides a technique for achieving a reduction in consumption current by eliminating the need for the stereoscopic image glasses to carry out period detection when radio signal reception is stopped.

Present Embodiment

The embodiment of the present invention is described below with reference to FIGS. 1 through 3.

[Summary]

A radio signal transmitter in the present embodiment receives, from an image display device such as a TV (television) or PC (personal computer), (i) synchronizing signals each indicating a timing of frame switching and (ii) liquid crystal shutter control data indicating "right-eye shutter open" when a right-eye image is displayed on the TV or PC display and "left-eye shutter open" when a left-eye image is displayed on the TV or PC display.

Then, a period detecting section provided in the radio signal transmitter measures the period of each synchronizing signal and converts the period into data, and the data is stored in the period data storage section. This allows the period data storage section to always have the latest period data stored therein.

Further, a liquid crystal shutter control pattern analysis section analyzes the liquid crystal shutter control data received from the image display device, finds a pattern of repetitive order of the right-eye and left-eye images, and the pattern is stored as liquid crystal shutter control pattern information in the liquid crystal shutter control pattern storage section. This allows the liquid crystal shutter control pattern storage section to always have the latest data stored therein.

Next, the radio signal transmitter simultaneously sends, to stereoscopic image glasses, the synchronizing signals, the period data stored in the period data storage section, and the liquid crystal shutter control pattern information stored in the liquid crystal shutter control pattern storage section, and the stereoscopic image glasses receive them.

After receiving the synchronizing signals, the period data, and the liquid crystal shutter control pattern information, the stereoscopic image glasses load, into an intermittent control timer, downtime data is stored in a period intermittent operation time register, and starts a timer operation. At the same time, a period intermittent control section turns off a radio signal receiving section. Then, after the timer operation is finished, the period intermittent control section turns on the radio signal receiving section, whereby reception is resumed. This is how the radio signal receiving section is controlled to carry out an intermittent operation.

Further, every time the radio signal receiving section receives a synchronizing signal from the radio signal transmitter, the stereoscopic image glasses generate liquid crystal shutter control data in accordance with the liquid crystal shutter control pattern information received at the same time. Further, every time the radio signal receiving section receives a synchronizing signal from the radio signal transmitter, a period signal generating section generates a period signal, and every time the period signal generating section generates a period signal, the stereoscopic image glasses generate liquid crystal shutter control signal timings. Then, in accordance with the liquid crystal shutter control data and the liquid crystal shutter control signal timings, the stereoscopic image glasses generate liquid crystal shutter control signals to drive the right and left liquid crystal shutters. Further, even after the radio signal receiving section is turned off, the period signal generating section continues to generate a period signal in accordance with the period data, and every time the period signal generating section generates a period signal, the stereoscopic image glasses generate liquid crystal shutter control data and liquid crystal shutter control signal timings. In this way, the stereoscopic image glasses repeat generation of liquid crystal shutter control signals.

This results in such an operation that while only the right-eye shutter opens while a right-eye image is being displayed on the TV or PC display, only the left-eye shutter opens while a left-eye image is being displayed on the TV or PC display.

[Configuration of an Image Display System]

As shown FIG. 1, an image display system includes: an image display device (not illustrated); and stereoscopic image glasses, which allow stereoscopic viewing of images displayed on the image display device. The image display device has a radio signal transmitter installed therein, and the radio signal transmitter transmits synchronizing signals, period data, and liquid crystal shutter control pattern information to the stereoscopic image glasses.

(Configuration of the Radio Signal Transmitter)

A configuration of the radio signal transmitter 20 according to the present embodiment is described below with reference to FIG. 1. FIG. 1 is a block diagram showing the configuration of the image display system including the radio signal transmitter 20 and the stereoscopic image glasses 30.

As shown FIG. 1, the radio signal transmitter 20 is used concomitantly with the stereoscopic image glasses 30, and allows stereoscopic viewing of images displayed on an image display device such as a TV or PC display. On the TV or PC display (not illustrated) serving as an image display device, right-eye and left-eye images are alternately displayed. Moreover, when an image update is made on the TV or PC display, the radio signal transmitter 20 receives synchronizing signals and liquid crystal shutter control data from the TV or PC display and transmits the synchronizing signals and the liquid crystal shutter control data to the stereoscopic image glasses 30. The liquid crystal shutter control data indicates whether a right-eye or left-eye image is displayed.

It should be noted that the radio signals may tale the form of infrared signals or electric wave signals, the present embodiment brings about a greater effect when the radio signals take the form of electric wave signals.

As shown in FIG. 1, the radio signal transmitter 20 includes a period detecting section 21, a period data storage section 22, a liquid crystal shutter control pattern analysis section 23, a liquid crystal control pattern storage section 24, and a radio signal transmitting section 25.

The period detecting section 21 detects the synchronizing signals outputted from the image display device, calculates an interval between the synchronizing signal, and outputs period data. The period data is stored in the period data storage section 22.

The liquid crystal shutter control pattern analysis section 23 analyzes the liquid crystal control data sent from the image display device and outputs a pattern of repetitive order of the right-eye and left-eye images as liquid crystal shutter control data information. The liquid crystal shutter control data information is stored in the liquid crystal shutter control pattern storage section 24.

The radio signal transmitting section 25 reads out the period data from the period data storage section 22 and reads out the liquid crystal shutter control pattern information from the liquid crystal shutter control pattern storage unit 24. The radio signal transmitting section 25 transmits the period data and the liquid crystal shutter control pattern information to the stereoscopic image glasses 30 together with the synchronizing signals.

The signals that are transmitted from the radio signal transmitter 20 to the stereoscopic image glasses 30 are illustrated in FIG. 1 in consideration of a case where such signals are transmitted every time a synchronizing signal is received from the image display device. It is also possible that such signals are intermittently transmitted once in several times a synchronizing signal is received.

(Configuration of the Stereoscopic Image Glasses)

Meanwhile, the stereoscopic image glasses 30 include a radio signal receiver unit 31, a period data storage section 32, a period signal generating section 33, a liquid crystal shutter control pattern storage section 34, a liquid crystal shutter control data generating section 35, a liquid crystal shutter control timing generating section 36, a liquid crystal shutter control section 37, and right and left lenses 38 with liquid crystal shutters. The right and left lenses 38 with liquid crystal shutters include right and left lenses 38a and liquid crystal shutters 38b.

The radio signal receiving section 31, which is a component that receives radio signals, receives synchronizing signals, period data, and liquid crystal shutter control pattern information from the radio signal transmitter 20. The period data thus received is stored in the period data storage section 32.

In accordance with the period data stored in the period data storage section 32 and the synchronizing signals outputted from the radio signal receiving section 31, the period signal generating section 33 generates a period signal having the same period as the period data and outputs the period signal to the liquid crystal shutter control signal timing generating section 36 and to the liquid crystal shutter control data generating section 35.

The radio signal receiving section 31 outputs the liquid crystal shutter control pattern information to the liquid crystal shutter control pattern storage section 34, and the liquid crystal shutter control pattern information is stored in the liquid crystal shutter control pattern storage section 34.

The liquid crystal shutter control data generating section 35 carries out an operation in accordance with the period signal outputted from the period signal generating section 33. The liquid crystal shutter control data generating section 35 reads out the liquid crystal shutter control pattern information from the liquid crystal shutter control pattern storage section 34. The liquid crystal shutter control data generating section 35 then outputs liquid crystal shutter control data.

Every time the period signal generating section 33 generates a period signal, the liquid crystal shutter control signal timing generating section 36 generates and outputs optimal liquid crystal shutter control timings as timings to control the liquid crystal shutters 38b for the right and left lenses 38a within the right and left lenses 38 with liquid crystal shutters.

At the liquid crystal shutter control timings outputted from the liquid crystal shutter control signal timing generating section 36, the liquid crystal shutter control section 37 generates right and left lens control signals based on the data, generated by the liquid crystal shutter control data generating section 35, which indicates whether the right-eye or left-images is displayed. The liquid crystal shutter control unit 37 then outputs the lens control signals to the liquid crystal shutters 38b for the right and left lenses 38a.

The right and left lenses 38 with liquid crystal shutters operate in accordance with the received control signals so that the liquid crystal shutters 38b are opened and closed.

It should be noted here that in the present embodiment, the stereoscopic image glasses 30 further include an intermittent control timer section 40, a period intermittent operation time register section 41, and a period intermittent control section 42.

The intermittent control timer section 40 has a timer that controls the length of time that the stereoscopic image glasses 30 continues carry out an intermittent operation of reception. The period intermittent operation time register section 41 stores the length of time counted by the intermittent control timer section 40. Desired time date is also stored by a microcomputer.

The period intermittent control section 42 outputs a receiving section OFF signal while the timer is operating in the intermittent control timer unit 40, and outputs a receiving section ON signal while the timer is under suspension.

[Operation of the Image Display System]

Operation of the image display system is described below with reference to FIG. 3. FIG. 3 is a flow chart showing the flow of operation of the image display system including the radio signal transmitter 20 and the stereoscopic image glasses 30.

(Operation of the Radio Signal Transmitter)

As shown in FIG. 1, the radio signal transmitter 20 receives, from an image display device (not illustrated) such as a TV or PC display, display device signals such as (i) synchronizing signals for switching between displaying a right-eye image and displaying a left-eye image on the image display device and (ii) liquid crystal shutter control data indicating whether the right-eye or left-eye image is displayed.

Figure 3:
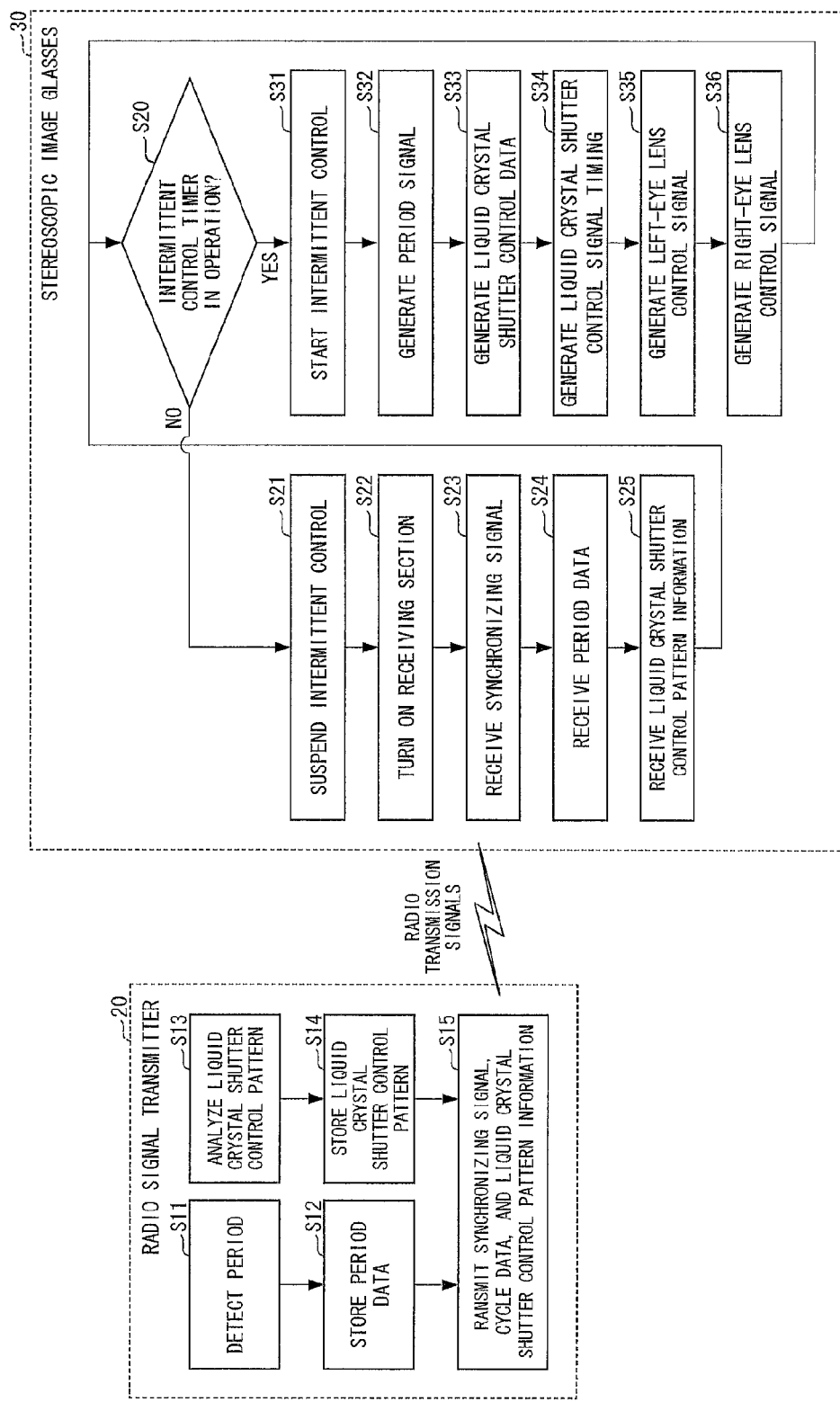
FIG. 3 is a flow chart showing an operation for controlling the radio signal transmitter and the stereoscopic image glasses.
Figure 4:
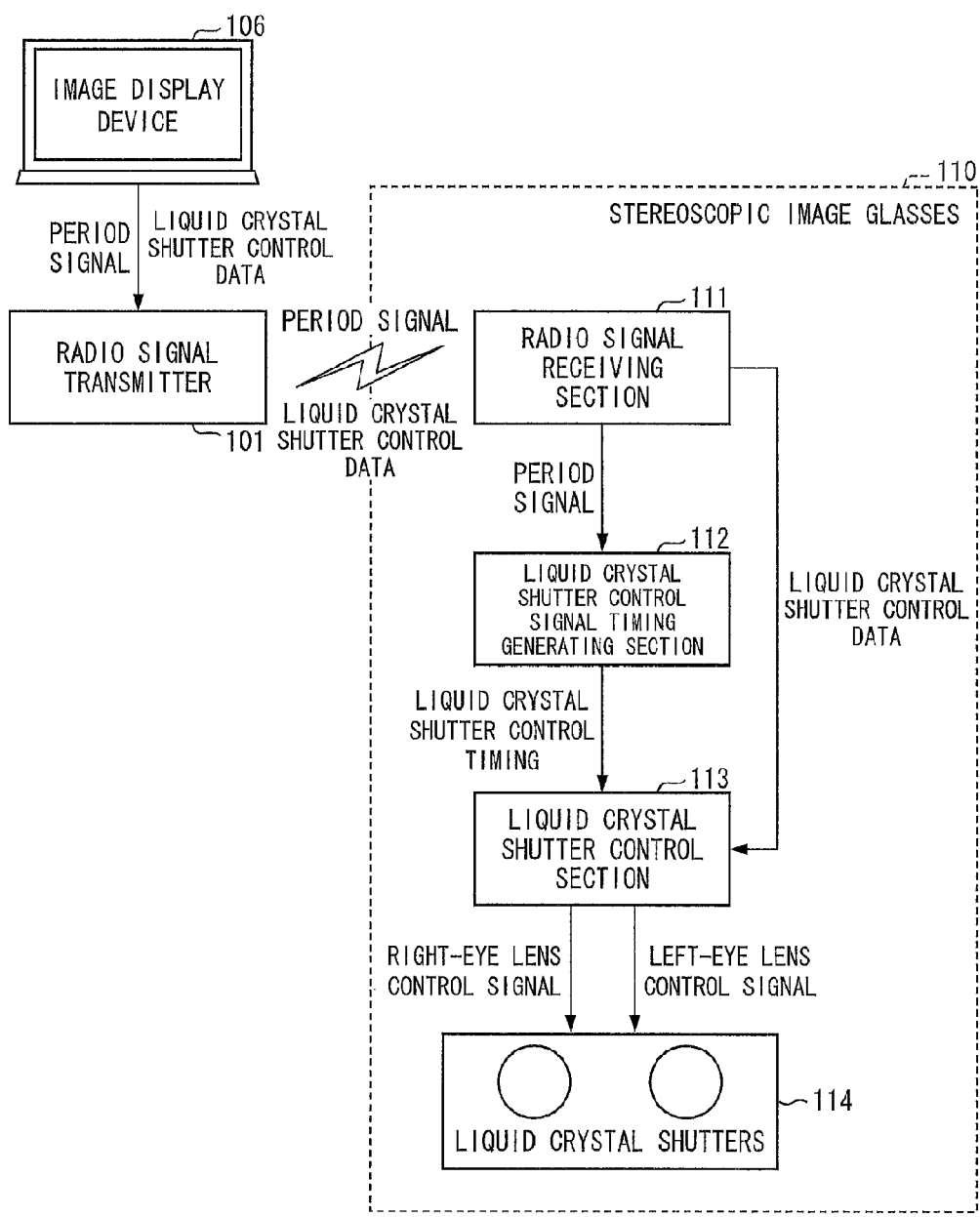
FIG. 4 is a block diagram showing a configuration of conventional stereoscopic image glasses.
Figure 5:
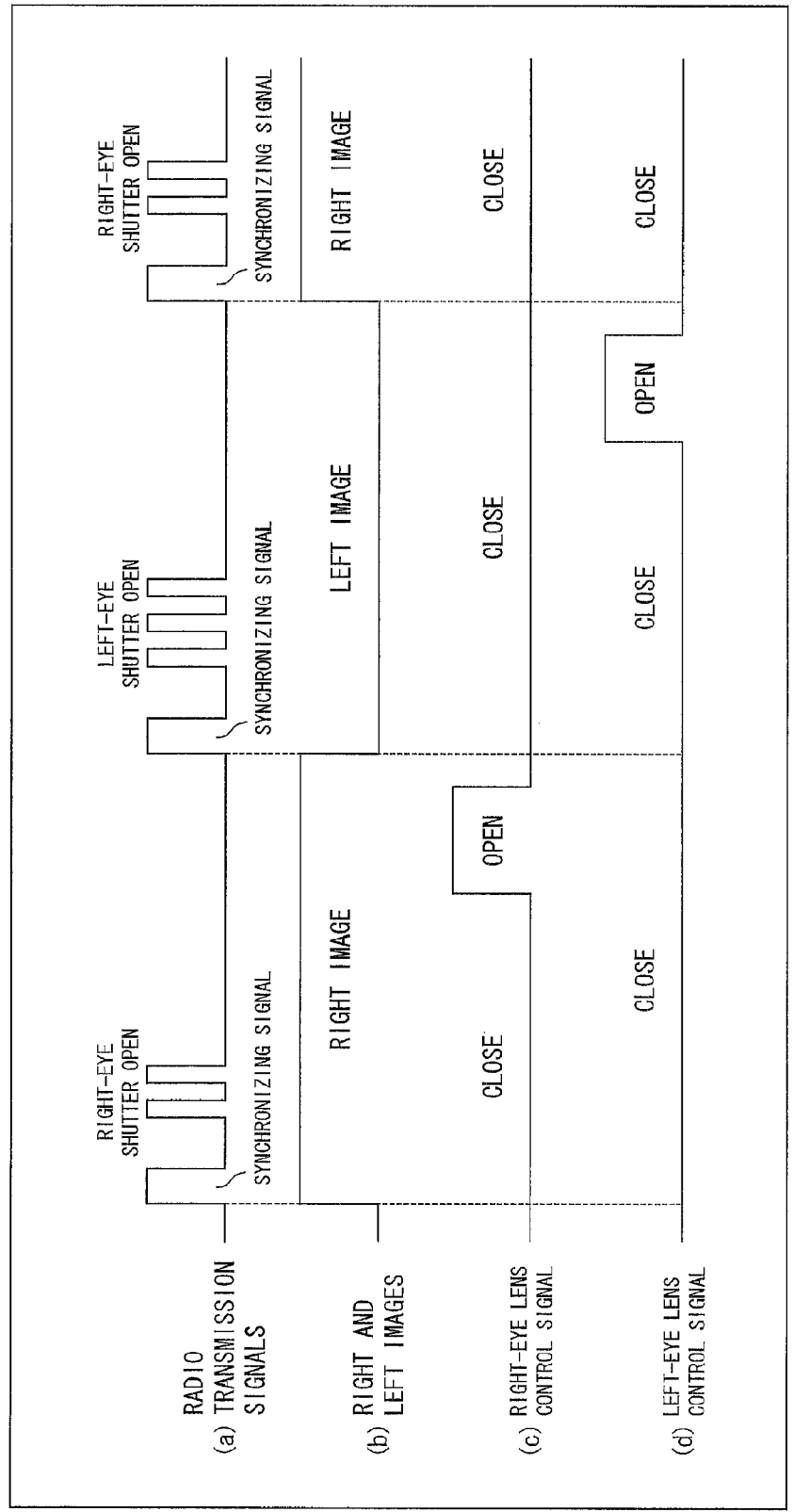
FIG. 5 is a set of timing charts (a) through (d) showing a control operation in the conventional stereoscopic image glasses.

As soon as the radio signal transmitter 20 receives the display device signals from the image display device, the period detecting section 21 detects the period of each of the synchronizing signals and outputs the resulting period data (S11) as shown in FIG. 3, and the period data is stored in the period data storage section 22 (S12).

Next, the liquid crystal shutter control pattern analysis unit 23 of the radio signal transmitter 20 analyzes the liquid crystal shutter control data and outputs a pattern of repetitive order of the right-eye and left-eye images as liquid crystal shutter control pattern information (S13). The liquid crystal shutter control pattern information is stored in the liquid crystal shutter control pattern storage section 24 (S14).

Next, the radio signal transmitting section 25 of the radio signal transmitter 20 reads out the period data and the liquid crystal shutter control pattern information from the period data storage section 22 and the liquid crystal shutter control pattern storage section 24, respectively, and transmits them to the stereoscopic image glasses 30 together with the synchronizing signals (S15).

By repeating this operation, the radio signal transmitter 20 transmits the synchronizing signals, the period data, and the liquid crystal shutter control pattern information at once in synchronization with the synchronizing signals sent from the image display device.

(Operation of the Stereoscopic Image Glasses)

Operation of the entire stereoscopic image glasses 30 thus configured is described below with reference to the timing charts shown (a) through (i) of FIG. 2 and on the flow chart shown in FIG. 3.

Figure 2:
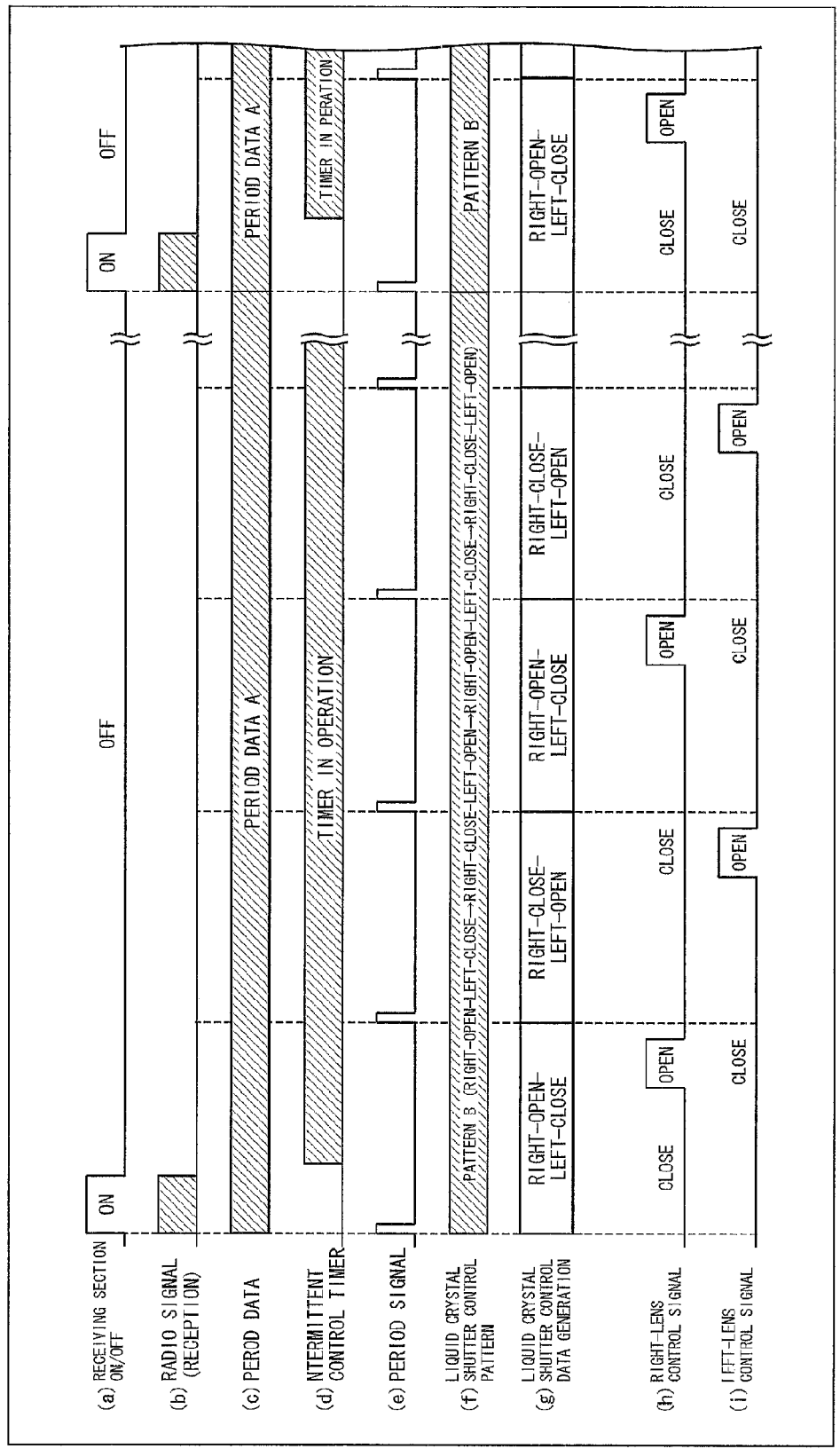
FIG. 2 is a set of timing charts (a) through (i) showing a control operation in the stereoscopic image glasses.

As shown in (a) of FIG. 2, the radio signal receiving section 31 operates only while receiving a receiving section ON signal and is in a standby state while receiving a receiving section OFF signal, thereby achieving a reduction in power consumption. It should be noted that the radio signal receiving section 31 receives the receiving section ON/OFF signals from the period intermittent control section 42 to the radio signal receiver unit 31.

Therefore, when the period intermittent control timer section 40 has counted a predetermined downtime during which the radio signal receiving section 31 is suspending reception, the period intermittent control timer section 40 outputs a "resume" command to the period intermittent control section 42, whereby the period intermittent control section 42 outputs a receiving section ON signal and the radio signal receiving section 31 resumes reception.

Moreover, as shown in (b) of FIG. 2, the radio signal receiving section 31 receives synchronizing signals, period data, and liquid crystal shutter control pattern information while re while receiving a receiving section ON signal. In the timing chart shown in (b) of FIG. 2, the radio signal receiver unit 31 receives the signals only once.

Next, as shown in (c) of FIG. 2, the period data (e.g., period data A) received by the radio signal receiving section is stored in the period data storage section 32 and outputted to the period signal generating section 33. This allows the period signal generating section 33 to repeat generation of a period signal, as shown in (e) of FIG. 2, even in cases where the radio signal receiver unit 31 is under suspension and does not receive a new synchronizing signal.

Meanwhile, as shown in (f) of FIG. 2, the liquid crystal shutter control pattern information (e.g., pattern B) received by the radio signal receiving section 31 is stored in the liquid crystal shutter control pattern storage section 34 and outputted to the liquid crystal shutter control data generation unit 35. It should be noted here that the pattern B is an operation pattern of "RIGHT-OPEN-LEFT-CLOSE→RIGHT-CLOSE-LEFT-OPEN→RIGHT-OPEN-LEFT-CLOSE→RIGHT-CLOSE-LEFT-OPEN", for example. Also, the liquid crystal shutter control pattern information is not particularly limited as long as it is a pattern that allows the liquid crystal shutters 38b to periodically open and close for the right and left lenses 38 with liquid crystal shutters. This allows repetition of generation of liquid crystal shutter control pattern data, as shown in (g) of FIG. 2, even in cases where the radio signal receiving section 31 is under suspension and does not receive new liquid crystal shutter control pattern information.

Next, in accordance with liquid crystal shutter control data shown in (g) as generated by the liquid crystal shutter control data generating section 35 every time a period signal shown in (e) of FIG. 2 is generated, a right-eye lens control signal shown in (h) of FIG. 2 and a left-eye lens control signal shown in (i) of FIG. 2 are outputted.

The operation is described below with reference to the flow chart shown in FIG. 3.

At the timing of a display update on the TV display, synchronizing signals, period data, and liquid crystal shutter control pattern information continue to be transmitted from the radio signal transmitter 20 to the stereoscopic image glasses 30. Although not described here, once on start-up, the stereoscopic image glasses 30 keeps the radio signal receiving section 31 operating so that the stereoscopic image glasses 30 get synchronized with the radio signal transmitter 20. Once the stereoscopic image glasses 30 get synchronized, the stereoscopic image glasses 30 start the operation shown in FIG. 3.

As shown in FIG. 3, the stereoscopic image glasses 30 first determine whether or not the timer of the intermittent control timer unit 40 is in operation (S20). Since, at the beginning of the operation, the intermittent control timer unit 40 is under suspension (NO in S20, S21), the period intermittent control section 42 outputs a receiving section ON signal, and the radio signal receiving section 31 carries out a reception operation (S22). The radio signal receiving section 31 first receives synchronizing signals and outputs them to the period signal generating section 33 (S23). The radio signal receiving section 31 then receives period data and stores it in the period data storage section 32 (S24). The radio signal receiving section 31 then receives liquid crystal shutter control pattern information and stores it in the liquid crystal shutter control pattern storage section 34 (S25). It should be noted here that the steps S23, S24, and S25 can be performed simultaneously.

Next, after the radio signal receiving section 31 receives the synchronizing signals, the period data, and the liquid crystal shutter control pattern information, the intermittent control timer unit 40 starts operating (YES in S20), and outputs a "suspend reception" command to the period intermittent control section 42. Then, by the period intermittent control section 42 outputting a receiving section OFF signal to the radio signal receiving section 31, the radio signal receiving section 31 is suspended. That is, intermittent control is started (S31).

In this state, the period signal generating section 33 receives the synchronizing signals from the radio signal receiving section 31, and repeats generation of a period signal having the same period as the period data stored in the period data storage section 32 (S32).

Every time the period signal generating section 33 generates a period signal, the liquid crystal shutter control data generating section 35 generates liquid crystal shutter control data (S33), and the liquid crystal shutter control signal timing generating section 36 generates liquid crystal shutter control signal timings (S34). Next, at the liquid crystal shutter control timings, the liquid crystal shutter control section 37 outputs right and left lens control signals (S35, S36).

After the step S36, the stereoscopic image glasses repeat (i) the operation of executing the steps S31 to S36 while the intermittent control timer section 40 is in operation and (ii) the operation of, when the intermittent control timer section 40 is suspended, resuming reception of radio signals through the radio signal receiving section 31 so that the steps S21 to S25 are executed.

As described above, by using the radio signal transmitter 20 and stereoscopic image glasses 30 of the present embodiment, intermittent reception is carried out. Further, by controlling the downtime when radio signal reception is under suspension, a drastic reduction in power consumption can be achieved. Furthermore, the radio signal transmitter 20 carrying out period detection, the reception of the radio signal for the cycle detection can be reduced. This allows a reduction in the number of times radio signal reception is carried out. This makes it possible to provide stereoscopic image glasses that can reduce power consumption for radio signal reception to ⅓ to ⅕.

It should be noted that although the types of display device signals (synchronizing signals and liquid crystal shutter control data) vary depending on TV and PC manufacturers, it is possible to provide a radio signal transmitter and stereoscopic image glasses compatible with various manufacturers by providing the liquid crystal shutter control pattern analysis section 23 of each radio signal transmitter 20 with information on the respective manufacturers' display device signals.

The present invention is not limited to the description of the embodiments above, but may be altered by a skilled person within the scope of the claims. An embodiment based on a proper combination of technical means disclosed in different embodiments is encompassed in the technical scope of the present invention.

As described above, a radio signal transmitter of the present invention includes: a period detecting section that detects a period of each of the synchronizing signals from an interval between the synchronizing signals received from the image display device; and a period data storage section in which the period detected by the period detecting section is stored as period data, the radio signal transmitter being configured such that the period data in the period data storage section is updated every time the period of each of the synchronizing signals is detected by the period detecting section.

Further, stereoscopic image glasses of the present invention include: a radio signal receiving section that receives a synchronizing signal, period data, and liquid crystal shutter control pattern information from a radio signal transmitter; a period signal generating section that repeatedly generates a period signal in accordance with received period data every time the radio signal receiving section receives a synchronizing signal from the radio signal transmitter; a period intermittent control section that carries out control so that the reception is suspended for a certain period of time, the stereoscopic image glasses being configured to continue generation of the period signal even while suspending the reception.

Further, an image display system of the present invention includes: such a radio signal transmitter as that described above and such stereoscopic image glasses as those described above.

This makes it unnecessary for the stereoscopic image glasses to carry out period detection. This, as a result, eliminates the need for the stereoscopic image glasses to receive a synchronizing signal and the like for period detection, thus achieving a reduction in consumption current.

Further, the radio signal receiving section of the stereoscopic image glasses employs the RF method, which requires a large amount of consumption current. Therefore, a further reduction in consumption currents can be achieved by causing the radio signal receiving section to carry out signal reception intermittently.

Therefore, the present invention brings about an effect of providing a radio signal transmitter, stereoscopic image glasses, and an image display system that achieve a reduction in power consumption.

Further, the radio signal transmitter of the present invention is preferably configured to further include: a liquid crystal shutter control pattern analysis section that analyzes the liquid crystal shutter control data and outputs a pattern of repetitive order of the right-eye and left-eye images as liquid crystal shutter control pattern information; and a liquid crystal shutter control pattern storage section in which the liquid crystal shutter control pattern information is stored.

According to the foregoing configuration, the radio signal transmitter analyzes liquid crystal shutter control data on receiving the liquid crystal shutter control data, and outputs a pattern of repetitive order of the right-eye and left-eye images as liquid crystal shutter control pattern information. The liquid crystal shutter control pattern information is stored in the liquid crystal shutter control pattern storage section of the radio signal transmitter. As a result, the liquid crystal shutter control pattern storage section always has the latest liquid crystal control shutter control pattern information stored therein. That is, the radio signal transmitter of the present invention always has the latest liquid crystal shutter control pattern information. Thus, transmission of the latest liquid crystal shutter control pattern information to the stereoscopic image glasses makes it unnecessary for the stereoscopic image glasses to include a liquid crystal shutter control pattern detection section. This makes it possible to provide stereoscopic image glasses that achieve a cost reduction.

The radio signal transmitter of the present invention is preferably configured to further include a radio signal transmitting section that reads out the period data and the liquid crystal shutter control pattern information from the period data storage section and the liquid crystal shutter control pattern storage section, respectively, and transmits the period data and the liquid crystal shutter control pattern information to the stereoscopic image glasses together with the synchronizing signals.

The foregoing configuration allows the radio signal transmitter to transmit the period data and the liquid crystal shutter control pattern information to the stereoscopic image glasses together with the synchronizing signals after receiving the synchronizing signals from the image display device.

The stereoscopic image glasses of the present invention is configured to further include: a liquid crystal shutter control data generating section that generates liquid crystal shutter control data in accordance with received liquid crystal shutter control pattern information every time the period signal generating section generates a period signal; liquid crystal shutters that control opening and closing of right and left lenses; a liquid crystal shutter control signal timing generating section which, every time the period signal generating section generates a period signal, generates liquid crystal shutter control timings for controlling opening and closing of the liquid crystal shutters; and a liquid crystal shutter control section that receives outputs from the liquid crystal shutter control data generating section and from the above liquid crystal shutter control signal timing generating section and generates liquid crystal shutter control signals for the right and left lenses.

According to the foregoing configuration, the liquid crystal shutter control data generating section generates liquid crystal shutter control data in accordance with received liquid crystal shutter control pattern information every time the period signal generating section generates a period signal. Further, every time the period signal generating section generates a period signal, the liquid crystal shutter control signal timing generating section generates liquid crystal shutter control timings for controlling opening and closing of the liquid crystal shutters. Furthermore, the liquid crystal shutter control unit receives outputs from the liquid crystal shutter control data generating section and from the above liquid crystal shutter control signal timing generating section and generates liquid crystal shutter control signals for the right and left lenses.

That is, the stereoscopic image glasses of the present invention internally generate period signal in accordance with the period data and the synchronizing signals, which are transmitted from the radio signal transmitter. Further, in accordance with the liquid crystal shutter control pattern information transmitted from the radio signal transmitter, the stereoscopic image glasses of the present invention generate the liquid crystal shutter control data and the liquid crystal shutter control signal timing, and then generate the liquid crystal shutter control signals for controlling opening and closing of the liquid crystal shutters for opening and closing of the right and left lenses.

This, as result, makes it possible to control the opening and closing of the liquid crystal shutters even in cases where the stereoscopic image glasses do not receive signals from the radio signal transmitter for a certain period of time.

The stereoscopic image glasses of the present invention is configured to further include an intermittent control timer section and a period intermittent operation time register section in order to control the reception at the radio signal receiving section, the stereoscopic image glasses being configured to communicate downtime stored in the period intermittent operation time register section to the intermittent control timer section and to suspend the reception at the radio signal receiving section while an intermittent control timer of the intermittent control timer section is in operation.

According to the foregoing configuration, the stereoscopic image glasses use the period intermittent control section to control the radio signal receiving section so that the radio signal receiving section suspends reception for a certain period of time (downtime). The downtime is stored in the period intermittent control register section, and transmitted to the intermittent control timer when the radio signal receiving section starts to suspend reception. This allows the radio signal receiving section to suspend reception while the time is in operation.

That is, the stereoscopic image glasses of the present invention can suspend reception for the duration of the downtime stored in the period intermittent control register section, thus achieving a reduction in consumption current in the radio signal receiving section.

INDUSTRIAL APPLICABILITY

The present invention can be applied, for example, to stereoscopic image glasses that allow viewing of a stereoscopic image by wirelessly transmitting and receiving information for switching between displaying a right-eye image and displaying a left-eye image on a TV or PC display and by controlling opening and closing of liquid crystal shutters for right-eye and left-eye lenses.

REFERENCE SIGNS LIST

20 Radio signal transmitter
21 Period detecting section
22 Period data storage section
23 Liquid crystal shutter control pattern analysis section
24 Liquid crystal shutter control pattern storage section
30 Stereoscopic image glasses
31 Radio signal receiving section
32 Period data storage section
33 Period signal generating section
34 Liquid crystal shutter control pattern storage Unit
35 Liquid crystal Shutter Control Data Generation section
36 liquid crystal shutter control signal timing generating section
37 Liquid crystal shutter control section
38 Right and left lenses with liquid crystal shutters (right and left lenses)
40 Intermittent control timer section
41 Period intermittent operation register section
42 Period intermittent control section

The invention claimed is:
1. A radio signal transmitter for receiving, from an image display device, (i) synchronizing signals for switching between displaying a right-eye image and displaying a left-eye image on the image display device and (ii) liquid crystal shutter control data indicating whether the right-eye or left-eye image is displayed, and for transmitting the synchronizing signals and the liquid crystal shutter control data to stereoscopic image glasses,
the radio signal transmitter comprising:

a period detecting circuit configured to detect a period of each of the synchronizing signals from an interval between the synchronizing signals received from the image display device; and a period data storage device in which the period detected by the period detecting section is stored as period data, the radio signal transmitter being configured such that the period data in the period data storage device is updated every time the period of each of the synchronizing signals is detected by the period device detecting circuit.

2. The radio signal transmitter as set forth in claim 1, further comprising:

a liquid crystal shutter control pattern analysis circuit configured to analyze the liquid crystal shutter control data and outputs a pattern of repetitive order of the right-eye and left-eye images as liquid crystal shutter control pattern information; and a liquid crystal shutter control pattern storage device in which the liquid crystal shutter control pattern information is stored.

3. The radio signal transmitter as set forth in claim 2, further comprising a radio signal transmitting circuit configured to read out the period data and the liquid crystal shutter control pattern information from the period data storage device and the liquid crystal shutter control pattern storage device, respectively, and transmits the period data and the liquid crystal shutter control pattern information to the stereoscopic image glasses together with the synchronizing signals.

4. Stereoscopic image glasses comprising:

a radio signal receiving circuit configured to receive the synchronizing signals, period data, and liquid crystal shutter control pattern information from the radio signal transmitter as set forth in claim 3;

a period signal generating circuit configured to repeatedly generate a period signal in accordance with received period data every time the radio signal receiving circuit receives a synchronizing signal from the radio signal transmitter;

a period intermittent control circuit configured to carry out control so that the reception is suspended for a certain period of time, the stereoscopic image glasses being configured to continue generation of the period signal even while suspending the reception.

5. The stereoscopic image glasses as set forth in claim 4, further comprising:

a liquid crystal shutter control data generating circuit configured to generate liquid crystal shutter control data in accordance with received liquid crystal shutter control pattern information every time the period signal generating circuit generates a period signal;

liquid crystal shutters that control opening and closing of right and left lenses;

a liquid crystal shutter control signal timing generating circuit configured such that, every time the period signal generating circuit generates a period signal, generates liquid crystal shutter control timings for controlling opening and closing of the liquid crystal shutters; and a liquid crystal shutter control circuit configured to receive outputs from the liquid crystal shutter control data generating circuit and from the above liquid crystal shutter control signal timing generating circuit and generates liquid crystal shutter control signals for the right and left lenses.

6. The stereoscopic image glasses as set forth in claim 4, further comprising an intermittent control timer circuit and a period intermittent operation time register device in order to control the reception at the radio signal receiving circuit, the stereoscopic image glasses being configured to communicate downtime stored in the period intermittent operation time register device to the intermittent control timer circuit and to suspend the reception at the radio signal receiving circuit while an intermittent control timer of the intermittent control timer circuit is in operation.

7. The stereoscopic image glasses as set forth in claim 5, further comprising an intermittent control timer circuit and a period intermittent operation time register device in order to control the reception at the radio signal receiving circuit, the stereoscopic image glasses being configured to communicate downtime stored in the period intermittent operation time register device to the intermittent control timer circuit and to suspend the reception at the radio signal receiving circuit while an intermittent control timer of the intermittent control timer circuit is in operation.

8. An image display system comprising:

an image display device;

the radio signal transmitter as recited in claim 1, a liquid crystal shutter control pattern analysis circuit configured to analyze the liquid crystal shutter control data and outputs a pattern of repetitive order of the right-eye and left-eye images as liquid crystal shutter control pattern information; and a liquid crystal shutter control pattern storage device in which the liquid crystal shutter control pattern information is stored;

a radio signal transmitting circuit configured to read out the period data and the liquid crystal shutter control pattern information from the period data storage device and the liquid crystal shutter control pattern storage device, respectively, and transmits the period data and the liquid crystal shutter control pattern information to the stereoscopic image glasses together with the synchronizing signals; and stereoscopic image glasses including a period signal generating circuit configured to repeatedly generate a period signal in accordance with received period data every time the radio signal receiving circuit receives a synchronizing signal from the radio signal transmitter;

a period intermittent control circuit configured to carry out control so that the reception is suspended for a certain period of time; and the stereoscopic image glasses being configured to continue generation of the period signal even while suspending the reception.

* * * * *